United States Patent [19]
Keith et al.

[11] Patent Number: 5,943,675
[45] Date of Patent: Aug. 24, 1999

[54] CHANGE LOG HISTORIAN SYSTEM FOR MEMORY SHARED BY MULTIPLE WORKSTATIONS

[75] Inventors: Michael J. Keith, Twinsburg; Mohammad S. Khan, Mantura; Victor J. Griswold, North Canton; David A. Johnston, Mentor, all of Ohio

[73] Assignee: Allen-Bradley Company, LLC, Milwaukee, Wis.

[21] Appl. No.: 08/719,672

[22] Filed: Sep. 25, 1996

[51] Int. Cl.[6] ................................................. G06F 17/30
[52] U.S. Cl. ........................................ 707/201; 707/10
[58] Field of Search .............................. 707/10, 201, 203, 707/200

[56] References Cited

U.S. PATENT DOCUMENTS

| | | | |
|---|---|---|---|
| 5,220,657 | 6/1993 | Bly et al. ................................. | 395/425 |
| 5,434,994 | 7/1995 | Shaheen et al. ........................ | 395/500 |
| 5,499,358 | 3/1996 | Nevarez ................................... | 395/600 |
| 5,530,855 | 6/1996 | Satoh et al. ............................. | 395/600 |
| 5,553,279 | 9/1996 | Goldring ................................. | 395/600 |
| 5,600,834 | 2/1997 | Howard ................................... | 395/617 |
| 5,603,024 | 2/1997 | Goldring ................................. | 395/619 |
| 5,666,530 | 9/1997 | Clark et al. ............................. | 395/617 |
| 5,671,407 | 9/1997 | Demers et al. .......................... | 395/608 |
| 5,684,984 | 11/1997 | Jones et al. ............................. | 395/610 |
| 5,721,915 | 2/1998 | Sockut et al. ........................... | 395/616 |
| 5,774,716 | 6/1998 | Harbinski et al. ...................... | 395/618 |
| 5,806,075 | 9/1998 | Jain et al. ............................... | 707/201 |
| 5,870,759 | 2/1999 | Bauer et al. ............................ | 707/201 |
| 5,870,765 | 2/1999 | Bauer et al. ............................ | 707/203 |

*Primary Examiner*—Paul V. Kulik
*Assistant Examiner*—Michael J. Wallace, Jr.
*Attorney, Agent, or Firm*—David G. Luettgen; John M. Miller; John J. Horn

[57] ABSTRACT

A communication-efficient change log historian allows workstations having images of a shared memory to remain correlated to the shared memory. The system comprises one or more workstations connected to a microprocessor-based device which includes a memory device. The memory device includes the shared memory, and also stores a memory change list and a memory change index. The memory change list forms a list of changes which have been made to the information stored in the shared memory area, and the change index is indicative of the location of the most recent entry to the memory change list. The workstations maintain an image of the shared memory area, and store workstation change indexes which are indicative of the most recent entry to the memory change list which has also been implemented to respective images of the shared memory area in the workstations. The workstation regularly compares the workstation change index with the memory change index, thereby permitting the workstation image to be dynamically correlated with the shared memory. Advantageously, the system implements updates only when the contents of the shared memory have changed, and updates only those portions of the shared memory which have changed. The system also allows for the dynamic correlation of the workstation image with the shared memory, and allows the microprocessor-based device to be a passive participant in this process.

27 Claims, 6 Drawing Sheets

CHANGE LOG HISTORIAN SYSTEM FOR MEMORY SHARED BY MULTIPLE WORKSTATIONS

FIELD OF THE INVENTION

This invention relates to memory shared by multiple workstations, and more particularly relates to memory shared by multiple workstations wherein a change log historian system forms a log of changes made by the workstations to the shared memory and is used to dynamically correlate the shared memory with images of the shared memory stored on the workstations.

DESCRIPTION OF RELATED ART

Network systems often utilize shared memory. For example, in an industrial control setting, multiple workstations may be simultaneously connected to a programmable logic controller. The programmable logic controller has a memory device, at least a portion of which forms a shared memory. The shared memory stores information which is of common interest to the programmable logic controller and to the workstations. Thus, each of the workstations are given the ability to access the information stored in the shared memory. Additionally, modifications to the information stored in the shared memory (such as revisions to program code) are generally accomplished by way of one or more of the workstations. Thus, each of the workstations may also be given the ability to change the contents of the shared memory.

Generally, each workstation that is connected to the shared memory maintains a local image or copy of the shared memory. A basic problem which must be overcome is to ensure that the workstations (and specifically the local images of the shared memory maintained by the workstations) remain properly correlated with the shared memory. In other words, when the contents of shared memory change, these changes must also be reflected in the local images of the shared memory stored by the workstations.

In one solution to this problem, updates are periodically performed to the workstations. Thus, the entire contents of the shared memory are periodically downloaded into each of the workstations. The frequency with which the workstation receives a new image of the shared memory is predetermined and is set depending on the frequency with which changes to the shared memory are implemented.

The problem with this approach, however, is that it is very inefficient in terms of communication overhead. It is always necessary for the workstation to download the entire contents of the shared memory, even if only a small percentage of the shared memory has actually changed. Indeed, since updates are performed periodically without regard to whether the contents of the shared memory have actually changed, a download may be performed even when none of the contents of the shared memory have changed. A more efficient scheme would implement updates only when the contents of the shared memory have changed, and in those situations where the contents have changed, would update only those portions of the shared memory which have changed.

Two problems have been encountered. First, it has been quite difficult to find a communication-efficient way to update only those portions of memory which have changed. Although various searching schemes have been used which are capable of identifying the changed portions of shared memory with great precision, these schemes have been found to be unsatisfactory. Specifically, to achieve a highly precise identification, these searching schemes require additional communication bandwidth. This is because, in order to search out and find changed portions of memory, comparisons must be made between the contents of the shared memory and the image stored in the workstation. As greater precision is desired, more comparisons must be made, and more communication bandwidth is required. A catch-22 thus exists: If the changed memory is identified with less precision, then communication bandwidth is wasted downloading "unchanged" information. If the changed memory is identified with greater precision, then communication bandwidth is wasted trying to identify the changed information.

Secondly, it has also been quite difficult to take into account the fact that workstations may go off-line. Generally, for a variety of reasons, it is desirable to provide systems with the flexibility to allow one or more workstations to go off-line while the remainder of the system continues operating. However, when a workstation comes back on-line, no simple and communication-efficient way has been devised for correlating the workstation image with the shared memory without significant computational overhead with respect to the server. It is often difficult (if not impossible) to determine what changes have been made since the workstation went off-line. Of course, the entire shared memory could be downloaded into the workstation. However, since in many cases the shared memory will have been modified only slightly or not at all, this approach is generally considered to be inefficient for the reasons described above.

A variety of sophisticated approaches have been developed for maintaining revision control in archival-type applications. However, these approaches have also been found to be unsatisfactory in the present context for the following two reasons. First, since these approaches are purely archival in nature, they do not allow for real time correlation of the workstation image with the shared memory. In traditional applications, there is no need for real time correlation because the workstation does not maintain and utilize its own working image of the shared memory. Rather, the workstation directly accesses the shared memory itself. In the field of industrial control, however, the workstation maintains and utilizes its own image of the shared memory. This image is intended to be cached copy of the shared memory of the programmable logic controller. Thus, there is a need for the ability to correlate the workstation's image with the shared memory in real time.

Second, these approaches require an active server. In other words, these approaches require that the server (which maintains the shared memory) know which workstations are currently logged on. In turn, such knowledge implies the use of strict log-on and log-off procedures. While this may be acceptable in traditional applications, it is not acceptable in the field of industrial control. The programmable logic controller is busy with other tasks and should not be bothered with log-on and log-off procedures. This is especially true given the fact that users tend to log on and log off relatively frequently in the industrial setting. Thus, instead of requiring the programmable logic controller to be active, it is desirable to allow the programmable logic controller be passive and to have the workstations be able to correlate themselves without significant involvement of the programmable logic controller. The workstations should be able to go off-line and come back on-line at random without requiring the knowledge of the programmable logic controller and without requiring the knowledge of other workstations.

Thus, what is needed is a more efficient scheme for keeping workstations correlated. This system should implement updates only when the contents of the shared memory have changed, and in those situations where the contents have changed, should update only those portions of the shared memory which have changed. Such a system should also allow a workstation to go off-line, come back on-line, and be re-correlated efficiently. Finally, this system should allow for the dynamic correlation of the workstation image with the shared memory, and should allow the microprocessor-based device to be a passive participant in this process.

BRIEF SUMMARY OF THE INVENTION

A change log historian system for dynamically correlating a plurality of workstations with a shared memory is presented. Generally, the system comprises one or more workstations connected to a microprocessor-based device having a memory device. The microprocessor-based device has a way to address or index individual memory components. The memory device includes a shared memory area, and also stores a memory change list and a memory change index. The memory change list forms a list of changes which have been made to the information stored in the shared memory, and the change index is indicative of the location of the most recent entry to the memory change list. The workstation maintains an image of the shared memory, and stores a workstation change index which is indicative of the most recent entry to the memory change list which has also been implemented in the workstation image of the shared memory. The workstation regularly compares the workstation change index with the memory change index, thereby permitting the workstation image to be dynamically correlated with the shared memory.

The operation of the system is initiated when a first workstation implements a new change to the shared memory. The new change is then logged to the memory change list associated with the shared memory, and the memory change index is updated. A second workstation regularly accesses the memory change index to ascertain whether a change has been made to the shared memory since an image of the shared memory stored in the second workstation was last updated. When the new change is detected, the second workstation then accesses the memory change list to obtain information pertaining to the change. The second workstation is then able to implement the change to its image of the shared memory.

In a variation, a log identification is used when a workstation downloads a new complete set of information to the shared memory. In this case, the workstation performing the download sets a new log identification number in the shared memory. Regular comparisons by a second workstation reveals that the log identification number in the shared memory does not correspond with their own log identification number. As a result, it opts to download the entire changed image to the second workstation (rather than reference the shared memory change list and update itself on a change-by-change basis).

In another variation, a copy marker is used when the shared memory is modified using multiple workstations. In this case, a copy identification number and a copy of a changed image are transferred from a first workstation to a second workstation, and then to the shared memory. The copy unique identification number corresponds to the copy marker, which is placed in the workstation change log. Regular comparisons reveal that a new copy identification number has been transferred to the change log associated with the shared memory and thus that the information in the shared memory has changed. However, the first workstation ascertains that the copy marker stored at the first workstation corresponds to the copy identification number associated with the changed shared memory, and thus that the changed shared memory is derived from the changed image stored at the first workstation. Accordingly, it is unnecessary to perform a full download to the first workstation.

The change log system of the present invention is a highly advantageous system which can be used by a plurality of workstations which have access to a shared memory. The system allows each workstation to conveniently and efficiently update its image of the shared memory when changes are made to the shared memory by other workstations. If a hierarchical addressing scheme is utilized, such as the ASA protocol, the system can be made even more efficient. Further, because the system is so efficient, it may be used with a large number of workstations without loading down the communication hardware associated with the shared memory. Thus, the system may be used with virtually any number of workstations. Additionally, the system allows workstations to go off-line and then come back on-line and quickly correlate with the shared memory by downloading only the information that has changed. Further, the system is simple, and correlation involves only shared memory-workstation coordination and not workstation-workstation coordination. Additional, the change log historian system is very flexible. For instance, the size of the change list could be increased or decreased for larger or smaller capacity shared memories. Finally, the system allows for the dynamic correlation of the workstation image with the shared memory, and allows the microprocessor-based device to be a passive participant in the process.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 1:
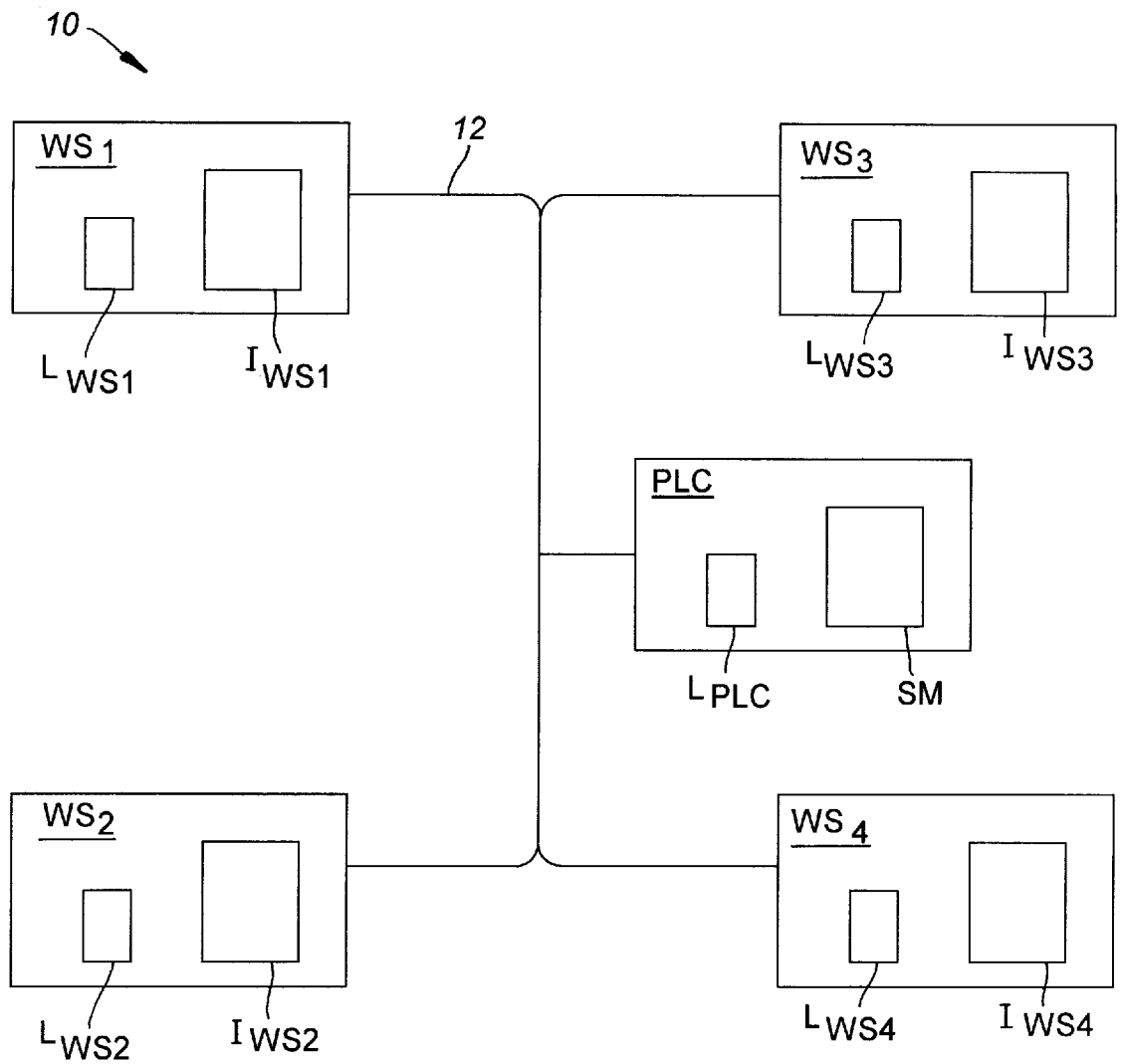
FIG. 1 illustrates a plurality of workstations coupled to a shared memory maintained by a programmable logic controller, the combination of these units implementing a change log system in accordance with the present invention.

FIG. 1 illustrates a network system 10 which utilizes the change log historian system in accordance with the present invention. In the illustrated embodiment, the present invention is used in the context of an industrial control system having a programmable logic controller PLC®. (PLC is a registered trademark of Allen-Bradley, LLC.) It should be recognized, however, that there exists a wide range of applications for the present invention, and that the programmable logic controller PLC is merely one example of a wide range of microprocessor-based devices which could be used to implement the present invention. Consequently, the present invention is not limited to industrial control systems.

The programmable logic controller PLC is coupled to a plurality of workstations $WS_1$–$WS_4$ by a network 12. As is known, the programmable logic controller PLC is also coupled to a plurality of discrete input/output devices (not illustrated), and controls the output devices based on inputs received from the input devices and information stored in memory. Of course, additional (or fewer) workstations could also be connected to the programmable logic controller PLC, in addition to a variety of other non-workstation devices. The term workstation is used broadly to refer to any device that maintains a local image of information stored in a shared memory. Preferably, though not required, the local image is of the entire shared memory.

The programmable logic controller PLC has an area of shared memory SM and an associated change log $L_{PLC}$. (The subscript "PLC" is used throughout to refer to the programmable logic controller.) Each of the workstations $WS_1$–$WS_4$ maintains a local image $I_{WS1}$–$I_{WS4}$, respectively, of the shared memory SM. (The subscripts "WS1", "WS2", "WS3", "WS4" are used throughout to refer to the workstations $WS_1$–$WS_4$, respectively.) The local image of the shared memory contains the same information as the shared memory, though it is not necessary that the information be in the same format. Each of the images $I_{WS1}$–$I_{WS4}$ has an associated off-line change log $L_{WS1}$–$L_{WS4}$ which is maintained by the workstations $WS_1$–$WS_4$, respectively.

The shared memory SM and change log $L_{PLC}$ are implemented in a memory device. Similarly, each of the images $I_{WS1}$–$I_{WS4}$ and associated off-line change logs $L_{WS1}$–$L_{WS4}$ are also each implemented in separate memory devices. In practice, these memory devices could each be a chip with memory, a hard drive, a floppy drive, an optical drive, or any other device which is capable of storing information, or any combination or plurality thereof. The memory device is used to store one or more of a variety of types of information which may be of common interest to the programmable logic controller PLC and the workstations $WS_1$–$WS_4$, such as data, program code, system operational parameters, and so on.

Although any addressing scheme could be used to identify areas of memory within the memory device, a hierarchical protocol that uses "class" and "instance" numbers is preferably utilized. Even more preferably, the ASA protocol is utilized. The ASA protocol is a hierarchical scheme for identifying areas of memory. Thus, within the programmable logic controller PLC, the contents of the shared memory SM are initially subdivided into I/O maps, programs, data, tasks, routines, tags and data types. Each specific program, for example, is designated with a "class" and "instance" number. Thus, a program #1 may be designated as "102, 001." The class number 102 indicates that a program is being referenced (as opposed to, e.g., an I/O map or data). The instance number 001 indicates that program #1 is being referenced (as opposed to a program #2 or a program #3).

The above groupings (i.e., I/O maps, programs, data, etc.) are further subdivided. Thus, the programs grouping is subdivided into tags, routines and data, which are also designated with "class" and "instance" numbers. For example, routine #2 of program #1 might use the following designation: "102, 001, 208, 002." The additional class number 208 indicates that a routine is being referenced (as opposed to a tag or data). The additional instance number 002 indicates that routine #2 is being referenced (as opposed to routine #3 or routine #1).

Routines are unusual in that they are further made up only of ladder rungs. (As is known, program code for programmable logic controllers is represented in the form of ladder logic, which dates back to the early days of programmable logic controllers.) Thus, there is no need to use "class" numbers, and only "instance" numbers are used. For example, the following sequence might be used to designate a specific rung of routine #2 of program #1: "102, 001, 208, 002, 3500." This sequence of numbers ("102, 001, 208, 002, 3500") is known as an internal object identifier (IOI), and is an address which designates an area of memory (in this case, the area at which rung #3500 is stored).

It should be noted that, in the preferred embodiment, each rung is also embedded with a unique identification number (rung UID). The embedded rung UID is used because rung numbers are subject to change as rungs are added and deleted. For example, if a routine has rungs 1–5 and any of these rungs is deleted, the remaining rungs are renumbered 1–4. Thus, the embedded rung UID is added at the end of the rung address IOI to provide a unique way to designate each rung. Thus, the fact that rung numbers may vary is taken into account.

Figure 2A:
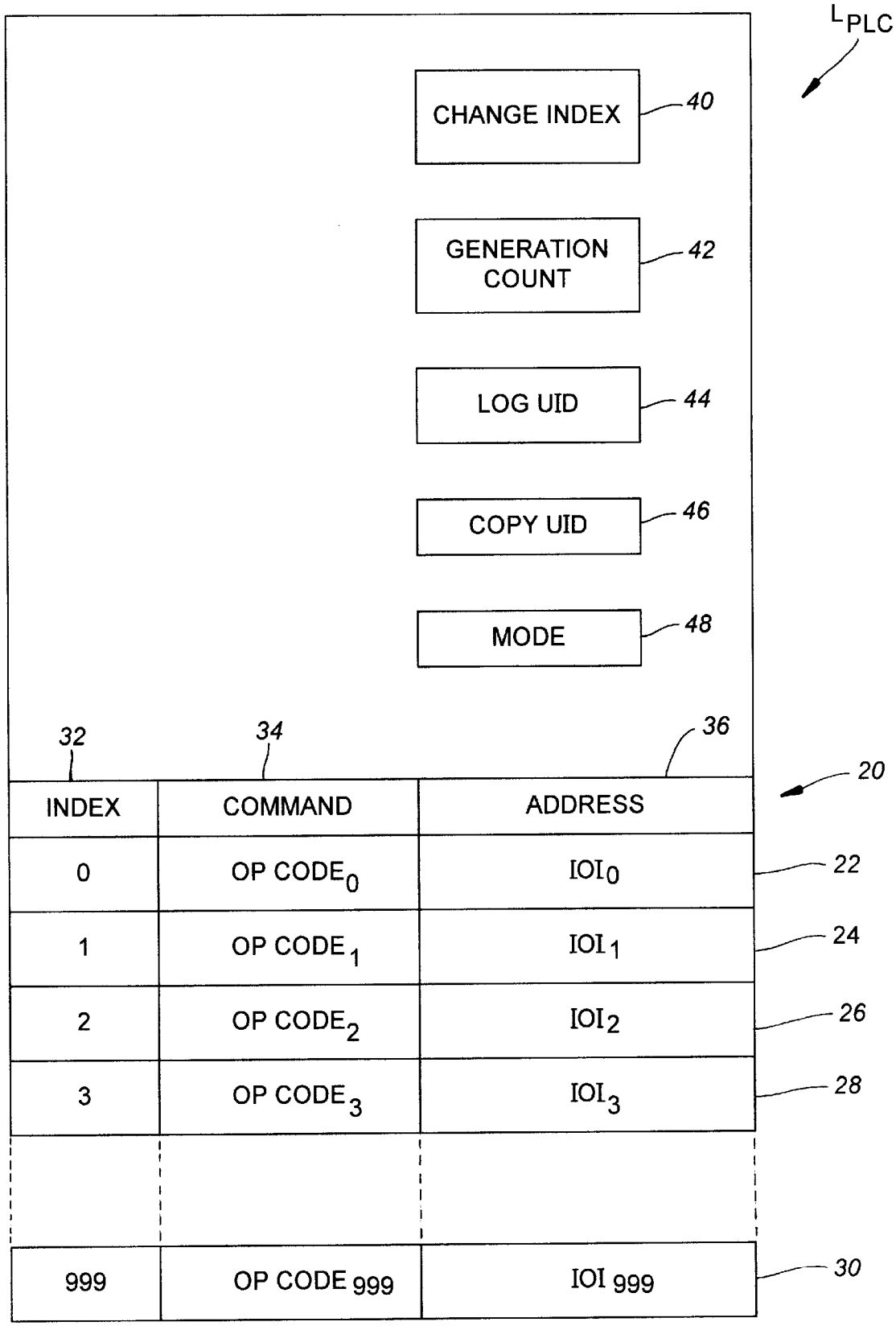
FIG. 2A illustrates a change log associated with a shared memory.
Figure 2B:
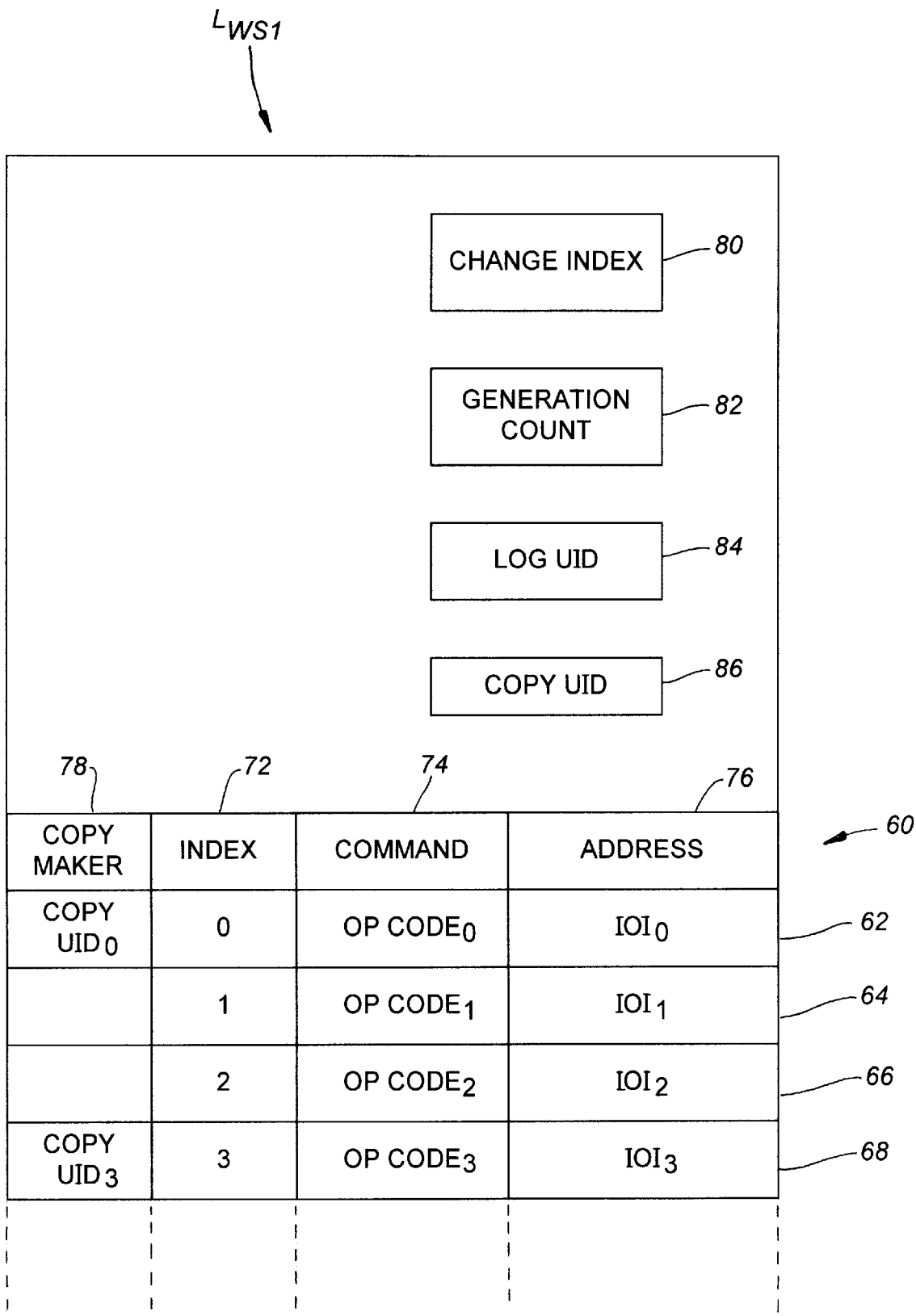
FIG. 2B illustrates a change log associated with an image of the shared memory stored at a workstation, both in accordance with the present invention.

FIG. 2A illustrates the change log $L_{PLC}$ of the programmable logic controller PLC in greater detail; and FIG. 2B illustrates the change log $L_{WS1}$ of an exemplary workstation $WS_1$ in greater detail. (The change logs $L_{WS2}$–$L_{WS4}$ of the other workstations $WS_2$–$WS_4$ are preferably the same as change log $L_{WS1}$.) The change log $L_{PLC}$ and the change log $L_{WS1}$ each comprise essentially two parts. Specifically, the change log $L_{PLC}$ comprises a list 20 of changes made and a series of registers 40–48. In like fashion, the change log $L_{WS1}$ comprises a list 60 of changes made and a series of registers 80–86.

The change list 20 comprises a series of log entries 22–30. One entry is logged to the change log $L_{PLC}$ for each change that is made to the shared memory SM. Each entry is divided into three sub-entries: an index sub-entry 32, a command sub-entry 34, and an address sub-entry 36. The index sub-entry 32 is simply a way of numbering the changes as they are made. The index starts at zero, and increments one unit per change. Hence, the first change has an index=0, the next change has an index=1, and so on. For reasons described below, the change list 20 is implemented as a circular buffer having one thousand entries. Thus, the possible values of the index sub-entry range from zero to 999.

The command sub-entry 34 describes the change that was made. The command sub-entries for log entries 22–28 (having index values 0–3) are $OpCode_0$ through $OpCode_3$. The command sub-entry for log entry 30 (having index value=999) is $OpCode_{999}$. Typical examples of commands include "create," "modify" and "delete." Thus, if a new program instance is created in the shared memory SM (i.e., a new program is added), and this change has index=0, then OpCode$_0$ has the numerical value which corresponds to the "create" command. The command sub-entry may additionally be used to indicate other change parameters, such as whether the change is of a local scope (e.g., a change to a routine that is used by only one program) or of a global scope (e.g., a change to a routine that is used by multiple programs). In this case, additional bits in the OpCode value may be used to represent this additional information.

The address sub-entry 36 of the log entry describes where in memory the change was made. In the preferred embodiment, the entry to the address sub-entry 36 is in the form of an IOI, discussed above. Thus, the address sub-entries for log entries 22–28 (having index values 0–3) are IOI$_0$ through IOI$_3$. The address sub-entry for log entry 30 (having index value=999) is IOI$_{999}$. In the event that the ASA protocol is not used, then the address sub-entry could be of any other format.

According to the preferred scheme utilizing the ASA protocol, changes to the shared memory SM are made on an instance-by-instance basis. Thus, each address sub-entry contains only a single IOI, and the specificity with which the change log denotes change is the ASA-instance. For example, if a particular instance is X bytes long, the workstation downloads X bytes when a log entry indicates that the particular instance has been modified.

However, since the ASA protocol is hierarchical, it is possible to vary the specificity with which change is denoted by varying the hierarchy level specified. With reference to the above example, if it is desirable to indicate that an entire program has changed, the address sub-entry could be simply "102, 001." On the other hand, if it is desirable to indicate that only one rung of one routine of the program has changed, the address sub-entry could be "102, 001, 208, 002, 3500." The use of a hierarchical addressing scheme thus significantly enhances the communication efficiency of the present invention by allowing the precision of the change identification to be varied depending on the type of change made.

The change list 60 in the workstation WS$_1$ has generally the same format as the change list 20 of the programmable logic controller PLC. Thus, the change list 60 has a sequence of entries 62–68 subdivided into sub-entries 72–76. However, as described in greater detail below, the workstation WS$_1$ may go off-line and implement changes to its image of the information stored in the shared memory. Thus, unlike the change list 20, the change list 60 is not a list of changes made to the shared memory, but instead is a list of changes made to the image I$_{WS1}$. Another difference is that the change list 60 has a fourth sub-entry 78 for copy markers. A final difference is that the change list 60 is not implemented as a circular buffer, but rather is implemented linearly and could have more than one thousand entries. These differences are discussed in greater detail below.

The second parts of the change log L$_{PLC}$ and the change log L$_{WS1}$ are the series of registers 40–48 and 80–86, respectively. The series of registers 40–48 and 80–86 includes change indexes 40 and 80, generation counts 42 and 82, log unique identifications (log UIDs) 44 and 84, copy unique identifications (copy UIDs) 46 and 86, and a mode indicator 48. (Unlike the change log L$_{PLC}$, the change log L$_{WS1}$ does not have a mode indicator.) The registers 40–48 and 80–86 store the values CI$_{PLC}$, GC$_{PLC}$, Log UID$_{PLC}$, Copy UID$_{PLC}$, Mode, CI$_{WS1}$, GC$_{WS1}$, Log UID$_{WS1}$, and Copy UID$_{WS1}$, respectively.

The change index 40 indicates the index value of the most recently logged entry to the change list 20. For example, if the most recent modification was logged at log entry 28 (the fourth entry of change list 20), then the change index will have a value CI$_{PLC}$=3.

The change index 80 indicates the index value of the most recent change to the shared memory SM which has also been implemented to the image I$_{WS1}$. (A separate change index, not illustrated, may be used by the workstation WS$_1$ in conjunction with the change list 60.) For example, if CI$_{PLC}$=3 as above, and CI$_{WS1}$=1, that means that four changes have been implemented to the shared memory, and that only two of those changes have been implemented to the image I$_{WS1}$ (neglecting for now the complications introduced by the remaining registers 42–46 and 82–86). Thus, when the workstation WS$_1$ tries to ascertain whether it is correlated, it will observe that CI$_{WS1}$≠CI$_{PLC}$. On this basis, the workstation WS$_1$ will conclude that it is not correlated but rather is two log entries behind. Therefore, the workstation WS$_1$ can then proceed with the correlation process on a change-by-change basis by implementing the change entries having index=2 and index=3.

In order to correlate, the workstation may refer to the command and address sub-entries. For example, if OpCode$_2$ indicates that a "delete" was performed, the workstation can delete the instance located at the image I$_{WS1}$ memory location designated by IOI$_2$. If OpCode$_3$ indicates that a "create" was performed, the workstation can create an instance in the image I$_{WS1}$ having the address IOI$_3$. In order to determine the specific characteristics of the instance, the workstation can examine the contents of the shared memory SM at IOI$_3$. In similar fashion, if OpCode$_3$ instead indicates that a "modify" was performed, the workstation can modify the instance at memory location IOI$_3$ of the image I$_{WS1}$ by examining the contents of the shared memory SM at the memory location IOI$_3$.

A very simple embodiment of the present invention could be implemented using only a non-circular change list 20 and change indexes 40 and 80. In this manner, a workstation could always determine the most recent change to the shared memory SM and to its own image of the shared memory, and could refer to a non-circular change list 20 when there is a discrepancy.

However, a number of additional features have been discovered which significantly enhance the advantages of the present invention. Thus, in the preferred embodiment, the change log L$_{PLC}$ is implemented as a circular buffer having one thousand entries. Once one thousand entries have been entered, the change log L$_{PLC}$ resets the change index and continues making entries at index=0.

The reason for having a circular change list 20 is that a (longer) linear change list would waste memory by storing log entries that could not be efficiently utilized. Once one thousand entries have been made, it is more communication-efficient for the workstation to simply download an entirely new image of the shared memory SM, rather than going through the process of doing one thousand updates. Thus, one thousand entries represents the point of diminishing returns in terms of communication efficiency. It should be noted, however, that the optimal size of the change list may vary depending on the size of the shared memory and the specificity with which changes are denoted.

In order to allow a circular buffer to be used, generation counts 42 and 82 are also used. Generation counts 42 and 82 overcome the following the problem: Each workstation needs to know whether it is, for example, three entries behind (in which case correlation by reference to the change list 20 is possible) or whether it is, for example, 1003 entries behind (in which case a full download of the shared memory SM to the workstation $WS_1$ must be performed). This information can not be determined using the change indexes 40 and 80 of the preferred embodiment, assuming the change list is implemented as a circular buffer.

Thus, generation count 42 is used to indicate the number of times that the change index 40 has been reset (due to reaching the 999th entry). Generation count 82 is used to indicate the number of times that the change index 40 had been reset the last time the workstation $WS_1$ performed an update. Consequently, by comparing the values of $CI_{PLC}$, $CI_{WS1}$, $GC_{PLC}$ and $GC_{WS1}$, the workstation can determine whether or not it is more than one thousand entries behind.

In the preferred embodiment, the starting value of the generation counts 42 and 82 is one. Thus, for example, if the change index 40 has been reset once, the generation count 42 will have a value of $GC_{PLC}=2$. When the change index 40 reaches its maximum value $CI_{PLC}=999$, the next log entry writes over the entry at the first position 22. In this case, the generation count 42 is incremented by one and the change index is reset to $CI_{PLC}=0$.

Another desirable feature is one which allows workstations to upload a new complete set of information to the shared memory SM, without having to log individual changes to the change list 20 as described above. In order to allow such uploading to occur, log UID 44 and log UID 84 are used. Log UID 44 and log UID 84 overcome the problem created in the following scenario: Assume the shared memory SM is modified twenty times after a complete upload is performed (thus, $CI_{PLC}=19$ and $GC_{PLC}=1$). Then, workstation $WS_2$ comes back on-line and has $CI_{WS2}=15$ and $GC_{WS2}=1$. Without more, workstation $WS_2$ (whose image $I_{WS1}$ is based on old information) will appear to be completely correlated after entering the four most recent changes. However, this is not the case. Even though $GC_{WS2} = GC_{PLC}$ and $CI_{WS2}$ will eventually equal $CI_{PLC}$, the image $I_{WS1}$, will not be correlated because it is based on a completely different version of the shared memory SM.

Log UID 44 and log UID 84 overcome this problem by indicating whether a workstation has downloaded a new complete set of information to the shared memory SM. Thus, if Log $UID_{WS1} \neq$ Log $UID_{PLC}$, then a complete download has occurred. In this case, the values $CI_{PLC}$, $CI_{WS1}$, $GC_{PLC}$ and $GC_{WS1}$ are irrelevant, and a complete download from the shared memory SM to the workstation $WS_1$ (or vice versa) must be performed in order for the workstation $WS_1$ to again be correlated. On the other hand, if Log $UID_{WS1}=$Log $UID_{PLC}$, then no such download has occurred. In this case, the values $CI_{PLC}$, $CI_{WS1}$, $GC_{PLC}$ and $GC_{WS1}$ may be helpful in correlating the workstation $WS_1$ with the shared memory SM.

Generally, a new log UID 44 is generated when a workstation implements a change to an image stored in its memory and then downloads the entire changed image (i.e., as opposed to only the change itself) to the programmable logic controller PLC. The log UID 44 is set by the workstation performing the download, and is adopted by both the workstation and the programmable logic controller PLC, as well as subsequent workstations downloading from the programmable logic controller PLC.

The log UIDs 44 and 84 are most useful where the workstation is uploading a new image which is not derived from an image held by another workstation. This is not always the case, however. Sometimes a first workstation $WS_1$ will have a correlated image $I_{WS1}$ and then go off-line and makes changes to the image $I_{WS1}$. The changed image is then transferred to a second workstation $WS_2$ via a floppy disk or via the network 12, and then is uploaded to the programmable logic controller PLC from the second workstation $WS_2$.

When the workstation $WS_1$ comes back on-line, it already has a correlated image, since the image that was uploaded is the same as image $I_{WS1}$. Alternatively, changes may have been made to the shared memory SM after the upload to the shared memory SM was performed. In this case, although the image $I_{WS1}$ is not correlated, all of the differences are logged in the change list 20. In either case, the shared memory is derived from the image $I_{WS1}$, and it would be communication-inefficient to require the workstation $WS_1$ to download from the programmable logic controller PLC. Instead, it is desirable for the workstation $WS_1$ to be able to come back on-line without having to do a full download in order to correlate itself.

The copy UID 46 and the copy UID 86 provide this benefit. The copy UID 46 indicates whether the image in the shared memory SM was downloaded by a workstation that was using an exact copy (or subset) of another workstation's image. (If off-line changes are made to the original memory after the copy is made, then the copy becomes a "subset" of the original image.)

When workstation $WS_1$ makes a copy of its image for another workstation $WS_2$, it generates a new copy UID and enters this copy UID in its off-line change log. This copy UID then serves as a copy marker. The copy UID also follows the image to the workstation $WS_2$, and subsequently to the programmable logic controller PLC. (Generally, it is not necessary for the copy UID and the copy marker to have the same value so long as there is a correspondence between the two. However, it is simpler to use the same value for both the copy marker and the copy UID.)

Generally, Copy $UID_{PLC}=0$ unless the image in the shared memory SM was downloaded by a workstation that was using an exact copy (or subset) of another workstation's image. Thus, when workstation $WS_1$ comes back on-line, it can check the copy UID, and use this information to synchronize itself more communication-efficiently. The operation of the copy UIDs 46 and 86 is discussed in greater detail in conjunction with FIGS. 3B and 5, below.

The final register is the mode identification 48. If a first workstation $WS_1$ is downloading a new image into the programmable logic controller PLC, it would be undesirable for a second workstation $WS_2$ to start downloading from the programmable logic controller PLC. Thus, the mode identification 48 is used to identify whether the programmable logic controller PLC is in a normal operating mode, or whether it is in a download mode. When the workstation $WS_1$ performs a download, it changes the Mode indicator to "download" so that other workstations will not try to download from the shared memory SM. When the download is complete, the workstation $WS_1$ sets the Mode indicator back to "normal."

Figure 3A:
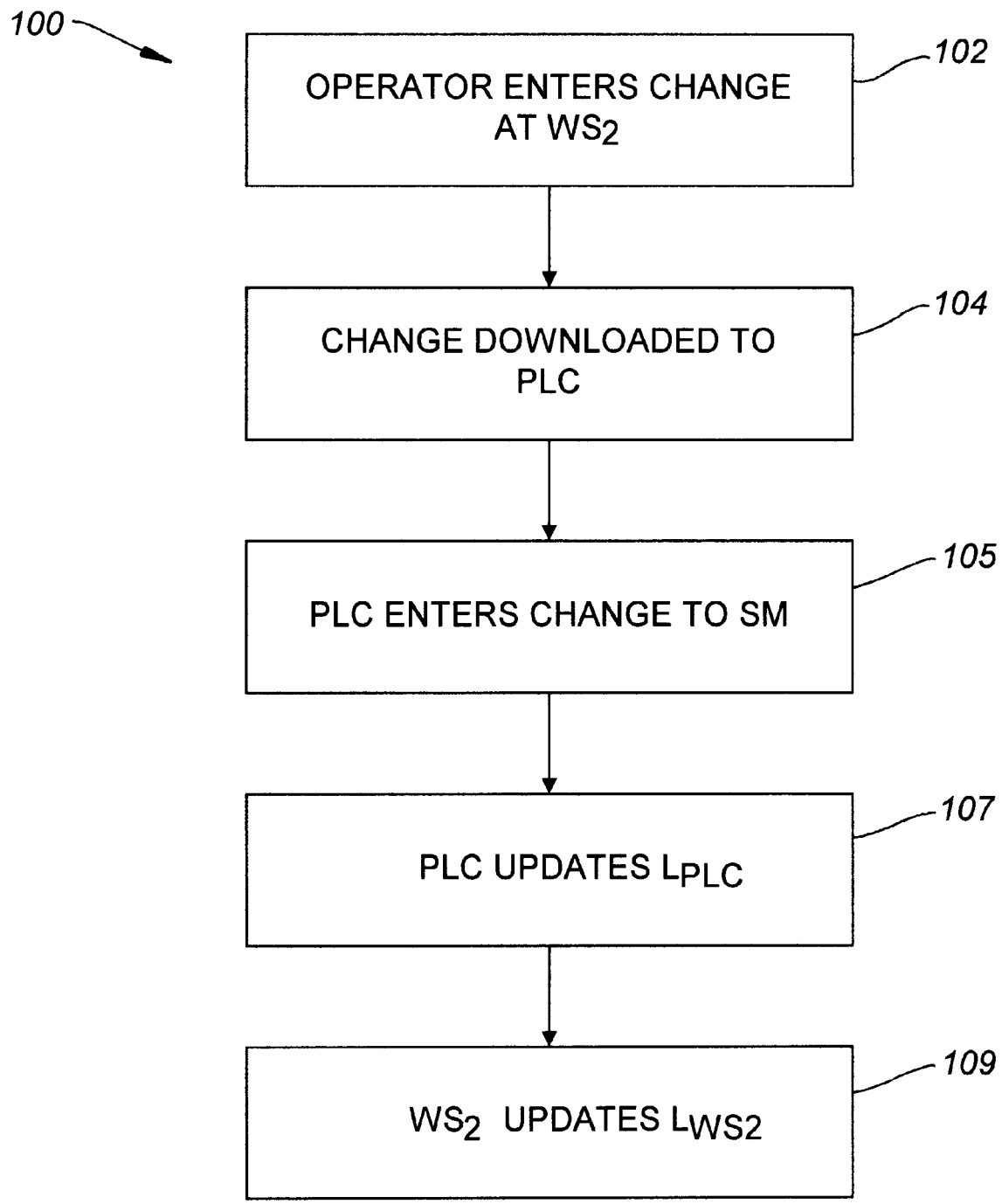
FIG. 3A illustrates a flow chart describing an exemplary process for changing the contents of a shared memory, wherein the change is performed by one workstation.
Figure 3B:
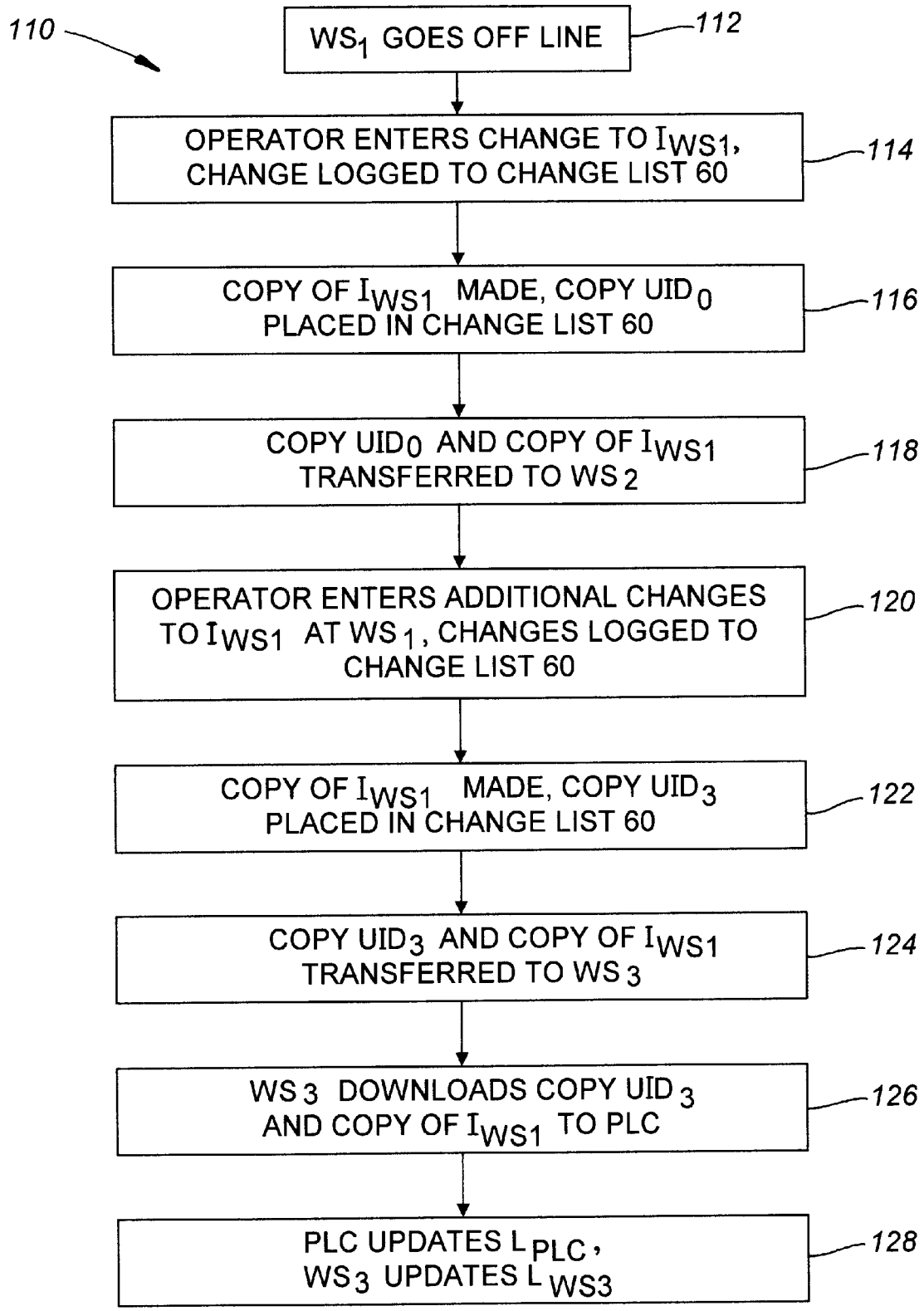
FIG. 3B illustrates a flow chart describing another exemplary process for changing the contents of a shared memory, wherein the change is performed using multiple workstations.
Figure 4:
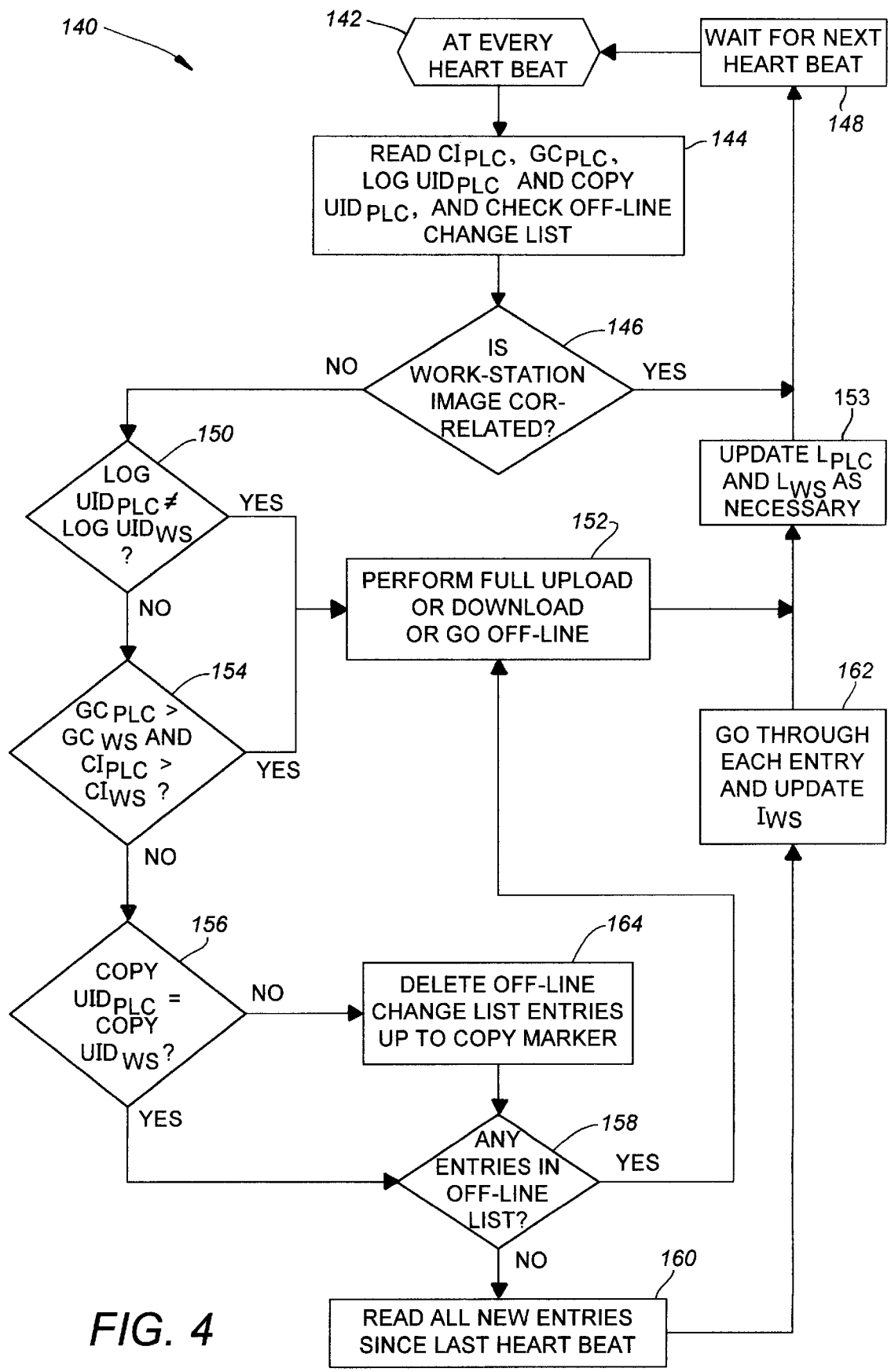
FIG. 4 illustrates a flow chart for correlating an image of a shared memory with the shared memory itself in accordance with the present invention.

FIGS. 3A, 3B and 4 illustrate the operation of the above-described features. In particular, FIGS. 3A and 3B illustrate two exemplary processes for changing the contents of the shared memory SM. FIG. 4 illustrates a generic overall process for keeping a workstation correlated.

Referring first to FIG. 3A, a simple process 100 for modifying the contents of the shared memory SM is illustrated wherein the modification is performed by any single workstation. Specifically, in step 102, an operator enters a change at the workstation $WS_2$. The desired change (or the entire image $I_{WS2}$) is communicated to the programmable logic controller PLC in step 104. The firmware of the programmable logic controller PLC then enters this change to the shared memory SM in step 105, and updates change log $L_{PLC}$ in step 107. Finally, the change log $L_{WS2}$ is updated in step 109.

The manner in which the change logs $L_{PLC}$ and $L_{WS2}$ are updated depends on how the change is implemented. For example, if only one change is communicated, then $CI_{PLC}$ and $CI_{WS2}$ (and possibly $GC_{PLC}$ and $GC_{WS2}$) will be incremented as described above. However, if workstation $WS_2$ downloads its entire image $I_{WS2}$ to the programmable logic controller PLC, then workstation $WS_2$ will generate a new log UID value (adopted by both Log $UID_{PLC}$ and Log $UID_{WS2}$) and will reset $CI_{PLC}$, $CI_{WS2}$, $GC_{PLC}$ and $GC_{WS2}$.

FIG. 4 illustrates a flow chart showing the steps used to correlate the workstation image of the shared memory with the shared memory itself. The correlation process 140 illustrated in FIG. 4 is generally applicable to any type of change which is made. The variables $CI_{WS}$, $GC_{WS}$, Log $UID_{WS}$, Copy $UID_{WS}$, $I_{WS}$ and $L_{WS}$ are used which are different than previously defined variables only in that they do not designate a specific workstation.

FIG. 4 is discussed first with reference to the exemplary change described in FIG. 3A. As illustrated in step 142, in order to synchronize the workstation image with changes made to the shared memory SM by other workstations, each on-line workstation establishes a heart beat mechanism. When invoked, this mechanism generates a periodic pulse which causes the workstation to repeat another iteration of the process 140. In practice, the heart beat mechanism could simply be implemented using the timer function in Microsoft® Windows™. Preferably, the heart beat mechanism operates at a rate of one beat per second. It is not necessary to synchronize the heart beat mechanisms of the various workstations.

In step 144, the workstation $WS_1$ reads the change index 40, the generation count 42, the log UID 44, and the copy UID 46 from the change log $L_{PLC}$, and checks the off-line change list 60. The registers 40–46 are compared against the respective registers 80–86 stored in the workstation $WS_1$ in step 146. Thus, the workstation $WS_1$ tests the following equalities:

$$CI_{WS1} = CI_{PLC}, \quad (1)$$

$$GC_{WS1} = GC_{PLC}, \quad (2)$$

$$\text{Log } UID_{WS1} = \text{Log } UID_{PLC}, \text{ and} \quad (3)$$

$$\text{Copy } UID_{WS1} = \text{Copy } UID_{PLC}. \quad (4)$$

If all of these equalities are true, and there are no entries in the off-line change list 60, then the image $I_{WS1}$ is completely correlated with the shared memory SM. Thus, no updates are necessary, and the workstation may proceed to wait for the next heart beat as illustrated by step 148.

If, on the other hand, any of the equalities do not hold true, or there are one or more entries in the off-line change list 60, then the system proceeds to step 150. In step 150, the workstation determines whether Log $UID_{WS1}$=Log $UID_{PLC}$. If this equality is not true, then the image $I_{WS1}$ is not correlated because a workstation has performed a download.

In general, all workstations that are on-line must be correlated with the shared memory SM. Thus, the workstation $WS_1$ which is not correlated has three options, as described by step 152. First, the workstation $WS_1$ may go off-line. Second, the workstation $WS_1$ could become correlated by downloading its image $I_{WS1}$ into the shared memory SM. Finally, the workstation $WS_1$ could become correlated by conforming its image $I_{WS1}$ to the shared memory SM. In this case, as described above, the fact that Log $UID_{WS1}$≠Log $UID_{PLC}$ means it is not possible for the workstation $WS_1$ to correlate itself by referencing the change list 20. Thus, the only way for the workstation $WS_1$ to correlate itself according to the third alternative is to perform a complete download from the shared memory SM. After the workstation $WS_1$ has correlated itself, change logs $L_{PLC}$ and $L_{WS1}$ are updated as necessary as step 153, and the workstation $WS_1$ waits for the next heart beat at step 148.

If, on the other hand, Log $UID_{WS1}$=Log $UID_{PLC}$, then the workstation proceeds from step 150 to step 154. At step 154, the workstation $WS_1$ determines if both $CI_{PLC}$>$CI_{WS1}$ and $GC_{PLC}$>$GC_{WS1}$. If this is the case, then the image $I_{WS1}$ is behind by more than one-thousand entries. Thus, it is not possible for the workstation $WS_1$ to correlate itself by referencing the change list 20. Consequently, the workstation $WS_1$ proceeds to step 152, and performs a full upload or download or goes off-line as described above.

If, on the other hand, the above condition does not exist, then one of the following conditions must exist:

$$CI_{PLC} > CI_{WS1} \text{ and } GC_{PLC} < GC_{WS1}, \quad (1)$$

or $$CI_{PLC} \leq CI_{WS1} \text{ and } GC_{PLC} = GC_{WS1}. \quad (2)$$

In either case, the image $I_{WS1}$ is not behind by more than one-thousand entries, and it may be possible for the workstation $WS_1$ to correlate itself by referencing the change list 20. Thus, the workstation $WS_1$ proceeds to step 156, where the system determines whether Copy $UID_{WS1}$=Copy $UID_{PLC}$. Since the shared memory was modified using only a single workstation, this equality is true. Thus, the workstation $WS_1$ proceeds to step 158.

At step 158, the workstation $WS_1$ ascertains whether there are any entries in its off-line change log $L_{WS1}$. So far, it has been assumed that if the image $I_{WS1}$ is not correlated with the shared memory SM, it is because changes have been made to the shared memory SM. Step 158 relates to an alterative reason, i.e., that changes have been made to the image $I_{WS1}$ while the workstation $WS_1$ was off-line. This could be the case if the present heart beat is the first since the workstation $WS_1$ came back on-line. If changes have been made to the image $I_{WS1}$, then the workstation proceeds to step 152, and performs a full upload or download or goes off-line as described above.

If, on the other hand, there are no entries in the off-line change log (i.e., no off-line changes have been made to the image $I_{WS1}$), then the workstation $WS_1$ reads all the new entries in the change list 20 since the last heart beat at step 160. The workstation $WS_1$ goes through each entry and updates the image $I_{WS1}$ at step 162. Thus, in steps 160 and 162, the workstation $WS_1$ correlates the image $I_{WS1}$ on a change-by-change basis by referencing the information contained in the change list 20, as previously described. Thereafter, the change logs $L_{PLC}$ and $L_{WS1}$ are updated as necessary as step 153, and the workstation $WS_1$ waits for the next heart beat at step 148.

FIG. 3B illustrates another sequence for modifying the shared memory wherein the modification is performed using multiple workstations. Since multiple workstations are used, the copy marker and copy UID features are also used. In this case, the workstation $WS_1$ goes off-line at step 112 having a correlated image $I_{WS1}$. An operator enters a change to the image $I_{WS1}$, and the workstation $WS_1$ logs the change into entry 62 of the off-line change log $L_{WS1}$ at step 114.

The operator then makes a copy of the image $I_{WS1}$, for example, on a floppy disk or via the network 12. Simultaneously, the workstation $WS_1$ places a copy marker (Copy $UID_0$ in FIG. 2B) in the off-line change log $L_{WS1}$ at step 116. At step 118, the operator loads the image $I_{WS1}$ into workstation $WS_2$ such that image $I_{WS2}$ and image $I_{WS2}$ are now the same. The copy marker Copy $UID_0$ is also transferred with the image $I_{WS1}$ into workstation $WS_2$, and a new entry is made in the off-line change log of the workstation $WS_2$, which contains the copy marker Copy $UID_0$.

Subsequently, the operator makes three additional changes to the image $I_{WS1}$ at step 120, and these three changes are logged to the off-line change log $L_{WS1}$ at entries 64 and 66. The operator then makes another copy of the image $I_{WS1}$. Simultaneously, the workstation $WS_1$ places a copy marker (Copy $UID_3$ in FIG. 2B) in the off-line change log $L_{WS1}$ at step 122. At step 124, the operator loads the image $I_{WS1}$ and Copy $UID_3$ into the workstation $WS_3$. Thus, image $I_{WS1}$ and image $I_{WS3}$ are now the same. However, since three additional changes were made to the image $I_{WS1}$ after a copy of image $I_{WS1}$ was transferred to workstation $WS_2$, the images in workstation $WS_2$ and workstation $WS_3$ are not the same.

Finally, the workstation $WS_3$ downloads the image and Copy $UID_3$ into the programmable logic controller PLC at step 126, and the change logs $L_{PLC}$ and $L_{WS1}$ are updated at step 128. Thus, the image $I_{WS1}$ is exactly the same as the shared memory, and the workstation $WS_1$ is correlated. The workstation $WS_2$, however, is not correlated.

Referring again to FIG. 4, the correlation of workstation $WS_1$ is discussed first. Given the situation described in FIG. 3B, the workstation $WS_1$ will proceed through step 142, step 144, step 146, step 150 and step 154 to step 156. At step 156, the workstation $WS_1$ ascertains whether Copy $UID_{PLC}$= Copy $UID_{WS1}$. Since the copy marker is not automatically transferred to the copy UID register 86, this equality is not true, and the workstation $WS_1$ proceeds to step 164. At step 164, the workstation $WS_1$ searches its change list 60 and finds copy markers Copy $UID_0$ and Copy $UID_3$. The workstation $WS_1$ then ascertains that Copy $UID_3$=Copy $UID_{PLC}$, and based on this equality, ascertains that the shared memory is derived from the image $I_{WS1}$. Since the shared memory SM contains all changes up to the copy marker Copy $UID_3$, these entries are deleted at step 164. At step 158, the workstation $WS_1$ determines whether there are any entries left in the change list 60, and proceeds as described above.

The workstation $WS_2$ correlates itself as follows. At step 164, the workstation $WS_2$ searches for, but does not find, the copy marker Copy $UID_3$ which corresponds to Copy $UID_{PLC}$. Thus, the workstation $WS_2$ does not delete any entries at step 164, and the entry containing Copy $UID_0$ remains. Consequently, at step 158, the workstation $WS_2$ is required to proceed to step 152 where it performs a full upload or download or goes off-line, as described above.

The remaining workstations (such as workstation $WS_4$) may be handled in a manner similar to the workstation $WS_2$, since they too will have Copy $UID_{WS}$≠Copy $UID_{PLC}$ at step 156. Alternatively, the remaining workstations may be handled by setting a new log UID in the programmable logic controller PLC when the download from workstation $WS_3$ is performed. In this case, the workstation $WS_1$ would be the workstation that decides the new log UID value (so that it could store the new log UID and advance from step 150 to step 154). Alternatively, if workstation $WS_3$ decides the new log UID, the process 140 could be modified to include additional steps in between steps 150 and 152 which allow workstations to check for a matching copy marker in the event of a log UID mismatch.

Notably, the workstations $WS_1$–$WS_4$ are the active participants in the process of FIG. 4, whereas the programmable logic controller PLC remains passive. When a workstation comes back on-line, it simply needs to refer to the change log $L_{PLC}$, including one or more of the variables $CI_{PLC}$, $GC_{PLC}$, Log $UID_{PLC}$ and Copy $UID_{PLC}$ and the change list 20. Based on the information provided, the workstation is able to correlate itself without significant involvement of the programmable logic controller PLC. There is no need for the programmable logic controller or the other workstations to monitor a given workstation's on-line status. Further, there is no need for the programmable logic controller PLC to monitor which changes have been implemented in the various workstations.

Further, as mentioned above, the heart beat mechanism preferably operates at a rate of about one beat per second. Because of the heart beat mechanism, the variables $CI_{WS1}$, $GC_{WS1}$, Log $UID_{WS1}$, and Copy $UID_{WS1}$ are regularly compared against the variables $CI_{PLC}$, $GC_{PLC}$, Log $UID_{PLC}$ and Copy $UID_{PLC}$, respectively. Thus, there is ongoing interaction between the workstations $WS_1$–$WS_4$ and the programmable logic controller PLC and the workstation images $I_{WS1}$–$I_{WS4}$ are dynamically correlated. This permits the workstation image to be used as cached copy of the shared memory of the programmable logic controller.

Although in the preferred embodiment the regular comparisons occur at a rate of about once per second, the regular comparisons could also much more often, or even less often. The significant aspect is that one or more of the variables $CI_{WS1}$, $GC_{WS1}$, Log $UID_{WS1}$, and Copy $UID_{WS1}$ are regularly compared against one or more of the variables $CI_{PLC}$, $GC_{PLC}$, Log $UID_{PLC}$ and Copy $UID_{PLC}$, respectively. The regularly occurring comparisons are what keep the images $I_{WS1}$–$I_{WS4}$ dynamically correlated. Less significant is the particular frequency with which the comparisons regularly occur. For a given application, the optimal comparison frequency depends on how often changes are expected, how quickly changes need to be incorporated, and so on. Also, it is not required that the regular comparisons occur at any particular frequency. Rather, they could occur at varying intervals (e.g., a 0.7 second interval followed by a 1.5 second interval followed by a 1.3 second interval), if so desired.

Many other changes and modifications may be made to the present invention without departing from the spirit thereof. The scope of these and other changes will become apparent from the appended claims.

We claim:

1. A change log system for dynamically correlating a plurality of workstations with a memory device in an industrial control system, said change log system comprising:

an industrial controller having said memory device, said memory device having stored therein
information which is monitored by said plurality of workstations, said information being stored in a shared memory area of said memory device,
a memory change list, said memory change list forming a list of changes which have been made to said information stored in said shared memory area, and
a memory change index, said memory change index being indicative of the location in said memory change list of the most recent entry to said memory change list;
a network which interconnects said industrial controller and said plurality of workstations; and
said plurality of workstations, each of said plurality of workstations including a workstation image of said shared memory area, and a workstation change index, said workstation change index being indicative of the most recent entry to said memory change list which has also been implemented in said workstation image of said shared memory area; and wherein said changes are made to said information while said plurality of workstations are connected to said by way of said network; and wherein said workstation change index of each of said plurality of workstations is regularly compared with said memory change index thereby permitting each said workstation image to be dynamically correlated with said shared memory area substantially immediately following when said changes to said information are made.

2. A change log system according to claim 1, wherein said industrial controller is a passive participant in the correlation of said first workstation, said industrial controller being passive in that it does not monitor whether said first workstation is on-line for purposes of keeping said first workstation correlated.

3. A change log system according to claim 1, wherein said industrial controller is a passive participant in the correlation of said first workstation, said industrial controller being passive in that it does not monitor changes made in said first workstation image of said shared memory area.

4. A change log system according to claim 1, wherein said first workstation change index is compared with said memory change index more often than once per minute, such that each said workstation image is dynamically correlated with said shared memory within at most about one minute following when said changes to said information are made.

5. A change log system according to claim 1, wherein said memory device further has a log identification stored therein, said log identification being set when a second workstation downloads a new complete set of information to said shared memory area, and wherein the setting of said log identification renders said memory change list and said memory change index temporarily unusable to said first workstation until said first workstation performs one of a full download and a full upload with said shared memory area.

6. A change log system according to claim 1, wherein said first workstation may optionally go off-line, and wherein said first workstation further includes a workstation change list, said workstation change list forming a list of changes which have been made to said first workstation image of said shared information after said first workstation has gone off-line.

7. A change log system for dynamically correlating a plurality of workstations with a memory device, said change log system comprising:

A. a microprocessor-based device having said memory device, said memory device having stored therein 1. information which is monitored by said plurality of workstations, said information being stored in a shared memory area of said memory device, 2. a memory change list, said memory change list forming a list of changes which have been made to said information stored in said shared memory area, and 3. a memory change index, said memory change index being indicative of the location in said memory change list of the most recent entry to said memory change list; and B. a first workstation, said first workstation being one of said plurality of workstations, said first workstation being connected to said microprocessor-based device by way of a network, and said first workstation including 1. a first workstation image of said shared memory area, and 2. a first workstation change index, said first workstation change index being indicative of the most recent entry to said memory change list which has also been implemented in said first workstation image of said shared memory area; and wherein said first workstation regularly compares said first workstation change index with said memory change index thereby permitting said first workstation image to be dynamically correlated with said shared memory area;

wherein said first workstation may optionally go off-line, and wherein said first workstation further includes a workstation change list, said workstation change list forming a list of changes which have been made to said first workstation image of said shared information after said first workstation has gone off-line; and wherein each entry logged to said workstation change list comprises 1. an index sub-entry which defines the location of said entry in said workstation change list;

2. a command sub-entry which indicates the type of operation that was performed on said first workstation image; and 3. an address sub-entry which indicates the location in said first workstation image where said operation was performed.

8. A change log system according to claim 7, wherein at least one entry in said workstation change list comprises a copy marker, said copy marker being generated in response to a copy being made of said first workstation image for another of said plurality of workstations, and wherein a correspondence between said copy marker and a copy identification stored at said microprocessor-based device indicates that said shared memory area is derived from said first workstation image.

9. A change log system for dynamically correlating a plurality of workstations with a memory device, said change log system comprising:

A. a microprocessor-based device having said memory device, said memory device having stored therein 1. information which is monitored by said plurality of workstations, said information being stored in a shared memory area of said memory device.

2. a memory change list, said memory change list forming a list of changes which have been made to said information stored in said shared memory area, and 3. a memory change index, said memory change index being indicative of the location in said memory change list of the most recent entry to said memory change list; and B. a first workstation, said first workstation being one of said plurality of workstations, said first workstation being connected to said microprocessor-based device by way of a network, and said first workstation including 1. a first workstation image of said shared memory area, and 2. a first workstation change index, said first workstation change index being indicative of the most recent entry to said memory change list which has also been implemented in said first workstation image of said shared memory area; and wherein said first workstation regularly compares said first workstation change index with said memory change index thereby permitting said first workstation image to be dynamically correlated with said shared memory area;

wherein addresses of said shared memory area are designated with a hierarchical protocol, and wherein information objects that form the hierarchy are designated by class numbers and instance numbers, said class numbers distinguishing different categories of information, and said instance numbers distinguishing different information objects within the same category; and wherein said memory change list includes
1. a first entry which denotes a first change at a first level of said hierarchy, and
2. a second entry which denotes a second change at a second level of said hierarchy.

10. A dynamic correlation method comprising:

providing a system comprising a first workstation, a second workstation, a plurality of additional workstations, and an industrial controller with a shared memory;

connecting said industrial controller, said first workstation, said second workstation and said plurality of additional workstations by way of a network;

implementing a new change to said shared memory with said first workstation, said implementing step occurring while said first workstation, said second workstation, and said plurality of additional workstations are connected to said industrial controller by way of said network;

logging said new change in a memory change list associated with said shared memory;

updating a memory change index which is indicative of a most recently logged entry in said memory change list;

maintaining an image of said shared memory at said second workstation, including the step of regularly accessing said memory change index with said second workstation to ascertain whether a change has been made to said shared memory since said image of said shared memory at said second workstation was last updated, said regularly accessing step further including, when it is ascertained that said new change has been made, accessing said memory change list with said second workstation and implementing said new change to said image of said shared memory at said second workstation; and maintaining images of said shared memory at said plurality of additional workstations, including the step of repeating said regularly accessing step for each one of said plurality of additional workstations in conjunction with a respective one of said images of said shared memory; and wherein said images of said shared memory at said second workstation and at said plurality of additional workstations are dynamically correlated with said shared memory, such that changes to said shared memory are implemented to said images of said shared memory on a change-by-change basis as said changes to said shared memory are implemented.

11. A dynamic correlation method comprising:

A. implementing a new change to a shared memory with a first workstation;

B. logging said new change in a memory change list associated with said shared memory;

C. updating a memory change index which is indicative of a most recently logged entry in said memory change list;

D. storing a first log identification number which is associated with said shared memory;

E. storing a second log identification number which is associated with said image of said shared memory;

F. regularly accessing said memory change index with a second workstation to ascertain whether a change has been made to said shared memory since an image of said shared memory stored in said second workstation was last updated, said regularly accessing step further including, when it is ascertained that said new change has been made,
1. ascertaining that said first log identification number corresponds to said second log identification number;
2. and, in response to said ascertaining step (F)(1), opting to access said memory change list with said second workstation and implement said new change to said image of said shared memory stored in said second workstation instead of replacing said image by downloading a complete copy of said shared memory to said second workstation.

12. A dynamic correlation method comprising:

A. implementing a new change to a shared memory with a first workstation, including
1. receiving a copy of a modified image from a second workstation, said copy being received at said first workstation, and
2. downloading said copy of said modified image from said first workstation to said shared memory, said new change being said downloading of said copy of said modified image;

B. logging said new change in a memory change list associated with said shared memory;

C. updating a memory change index which is indicative of a most recently logged entry in said memory change list;

D. storing a copy marker in a second workstation change lists

E. storing a copy identification number which is associated with said shared memory, said copy identification number corresponding to said copy marker;

F. regularly accessing said memory change index with said second workstation to ascertain whether a change has been made to said shared memory since an image of said shared memory stored in said second workstation was last updated, said regularly accessing step further including, when it is ascertained that said new change has been made;
1. accessing said memory change list with said second workstation,
2. ascertaining that said copy identification number corresponds to said copy marker,
3. in response to said ascertaining step (F)(2), further ascertaining that said information in said shared memory is derived from said second workstation and that said second workstation can be correlated by reference to said memory change list, and
4. implementing said new change to said image of said shared memory stored in said second workstation by reference to said memory change list.

13. A dynamic correlation method comprising:
A. hierarchically organizing a shared memory into a plurality of levels of information including an upper level and a lower level, each of said plurality of levels being divided into different classes of information, each of said classes being further subdivided into specific instances of information;
B. implementing first and second new changes to said shared memory with a first workstation, including
  1. entering said first new change at said lower level of said hierarchy, said change affecting exactly one lower level instance; and
  2. entering said second new change at said upper level of said hierarchy, said change affecting exactly one upper level instance and a plurality of lower level instances;
C. logging said first and second new changes in a memory change list associated with said shared memory;
D. updating a memory change index which is indicative of a most recently logged entry in said memory change list;
E. regularly accessing said memory change index with a second workstation to ascertain whether a change has been made to said shared memory since an image of said shared memory stored in said second workstation was last updated and, after it is ascertained that said first and second new changes have been made, accessing said memory change list with said second workstation and implementing said first and second new changes to said image of said shared memory stored in said second workstation.

14. A dynamic correlation method comprising:
implementing a new change to a shared memory with a first workstation;
logging said new change in a memory change list associated with said shared memory;
updating a memory change index which is indicative of a most recently logged entry in said memory change list;
regularly accessing said memory change index with a second workstation to ascertain whether a change has been made to said shared memory since an image of said shared memory stored in said second workstation was last updated and, after it is ascertained that said new change has been made, accessing said memory change list with said second workstation and implementing said new change to said image of said shared memory stored in said second workstation; and
wherein said shared memory is maintained by a passive microprocessor-based device, said microprocessor-based device being passive in that is does not monitor whether said second workstation is on-line for purposes of keeping said second workstation correlated.

15. A method of modifying a shared memory, said shared memory being associated with a memory change list for permitting workstations to be dynamically correlated on a change-by-change basis, said method comprising:
storing an image of said shared memory at a first workstation;
implementing a change to said image thereby creating a changed image, and storing said changed image at said first workstation;
transferring a new copy identification number and a first copy of said changed image to a second workstation, and in response placing a copy marker in a first workstation change log, said copy marker corresponding to said new copy identification number;
transferring said new copy identification number and a second copy of said changed image from said second workstation to said shared memory; and
comparing a copy identification number associated with said first workstation with a copy identification number associated with said shared memory and ascertaining that said copy identification number associated with said shared memory has changed to said new copy identification number, and ascertaining that said copy marker stored at said first workstation corresponds to said new copy identification number stored at said shared memory, and in response ascertaining that information in said shared memory is derived from said changed image stored at said first workstation and that neither a complete download nor a complete upload need be performed in order for said first workstation to be correlated with said shared memory.

16. A method according to claim 15, wherein said first workstation change log comprises a first workstation change list, and wherein said copy marker is placed in said first workstation change list, and further comprising the step of deleting all entries in said first workstation change list which were entered prior to the placement of said copy marker in said first workstation change list.

17. A method according to claim 16, further comprising the step of ascertaining whether any entries remain in said first workstation change list after said deleting step is performed,
and, if entries remain, then performing one of a full download from said shared memory to said first workstation and a full download from said first workstation to said shared memory, and subsequently bringing said first workstation on-line,
and, if no entries remain, then bringing said first workstation on-line, and performing neither a full download from said shared memory to said first workstation nor a full download from said first workstation to said shared memory.

18. A method of modifying a shared memory with a first workstation and thereafter correlating a second workstation with said shared memory, said shared memory being associated with a memory change list for permitting workstations to be dynamically correlated on a change-by-change basis, said method comprising:
storing an image of said shared memory at said first workstation;
implementing a change to said image thereby creating a changed image, and storing said changed image at said first workstation;
generating a new log identification number at said first workstation;
transferring said new log identification number and said changed image to a device which comprises said shared memory, and replacing contents of said shared memory with said changed image;
regularly comparing a first log identification number associated with said second workstation with a second log identification number associated with said shared memory and ascertaining that said second log identification number associated with said shared memory has changed to said new log identification number, including ascertaining that said first log identification number does not correspond to said new log identification number, and in response opting to (1) download the entire said changed image from said shared memory to said second workstation rather than (2) reference said change list associated with said shared memory and update said second workstation on a change-by-change basis.

19. An industrial control system comprising:
A. a network which interconnects a plurality of workstations;
B. a programmable controller having a memory device, said memory device having stored therein
   1. information which is monitored by said plurality of workstations, said information being stored in a shared memory area of said memory device,
   2. a memory change list in the form of a circular buffer, said memory change list forming a list of changes which have been made to said information stored in said shared memory area,
   3. a memory change index, said memory change index being indicative of the location in said memory change list of the most recent entry to said memory change list,
   4. a log identification, said log identification being set when one of said plurality of workstations downloads a new complete set of information to said shared memory area, and wherein the setting of said log identification renders said memory change list and said memory change index temporarily unusable to a remaining workstation until said remaining workstation performs one of a full download and a full upload with said shared memory area, and
   5. wherein addresses of said shared memory area are designated with a hierarchical protocol, and wherein information objects that form the hierarchy are designated by class numbers and instance numbers, said class numbers distinguishing different categories of information, and said instance numbers distinguishing different information objects within the same category, and wherein said memory change list includes (a) a first entry which denotes a first change at a first level of said hierarchy and (b) a second entry which denotes a second change at a second level of said hierarchy;
C. a first workstation, said first workstation being included among said plurality of workstations, said first workstation being connected to said programmable controller by said network, said first workstation including
   1. a first workstation image of said shared memory area,
   2. a first workstation change index, said first workstation change index being indicative of the most recent entry to said memory change list which has also been implemented in said first workstation image of said shared memory area,
   3. a first workstation change list, said first workstation change list forming a list of changes which have been made to said first workstation image of said shared information after said first workstation goes off-line, wherein at least one entry comprises a copy marker, said copy marker being generated in response to a copy being made of said first workstation image for another of said plurality of workstations, and wherein a correspondence between said copy marker and a copy identification stored at said microprocessor based devices indicates that said shared memory area is derived from said first workstation image;
D. a second workstation, said second workstation being included among said plurality of workstations, said second workstation being connected to said programmable controller by said network, and said second workstation including
   1. a second workstation image of said shared memory area, and
   2. a second workstation change index, said second workstation change index being indicative of the most recent entry to said memory change list which has also been implemented in said second workstation image of said shared memory area; and
E. wherein said first workstation regularly compares, at least once per minute, said first workstation change index with said memory change index thereby permitting said first workstation image to be dynamically correlated with said shared memory area; and
F. wherein said microprocessor-based device is a passive participant in the correlation of said first workstation, said microprocessor-based device being passive in that it does not monitor whether said first workstation is on-line for purposes of keeping said first workstation correlated and in that in that it does not monitor changes made in said first workstation image of said shared memory area.

20. A dynamic correlation method for use in an industrial control system, the method comprising:
A. providing said industrial control system, said industrial control system comprising an industrial controller, a first workstation, and a plurality of additional workstations;
B. connecting said industrial controller, said first workstation, and said plurality of additional workstations by way of a network;
C. storing a plurality of images of a shared memory at said plurality of additional workstations, said shared memory being a memory of said industrial controller;
D. implementing a new change to said shared memory with said first workstation, said implementing step occurring while said first workstation and said plurality of additional workstations are connected to said industrial controller by way of said network,
E. making a record of said change implemented to said shared memory in a change log associated with said shared memory;
F. dynamically correlating said plurality of images of said shared memory with said shared memory, said dynamically correlating step including the following steps, which are each performed for each one of said plurality of workstations in conjunction with a respective one of said plurality of images of said shared memory,
   1. ascertaining whether a change has been made to said shared memory since said image of said shared memory was last updated, and
   2. implementing said new change to said image of said shared memory after it is ascertained that said new change has been made;
   wherein changes to said shared memory are implemented to said images of said shared memory on a change-by-change basis as said changes to said shared memory are implemented.

21. A method according to claim 20, wherein said dynamically correlating step further comprises the step of storing information regarding changes that have been made to said image of said shared memory, said storing step being performed by each one of said plurality of workstations in conjunction with a respective one of said plurality of images of said shared memory.

22. A method according to claim 21, wherein said dynamically correlating step further comprises the step of regularly comparing (1) said information regarding changes that have been made to said image of said memory is with (2) said change log, said comparing step being performed more often than once per minute, and said comparing step being performed by each one of said plurality of workstations in conjunction with a respective one of said plurality of images of said shared memory.

23. A method according to claim 20, wherein said change log comprises a memory change list, said memory change list forming a list of changes which have been made to said information stored in said shared memory.

24. A method according to claim 20, wherein said changes to said shared memory are implemented to said images of said shared memory substantially immediately following when changes to said shared memory are implemented.

25. A method according to claim 20, wherein said industrial controller is a passive participant in the correlation of each of said plurality of workstations, said industrial controller being passive in that it does not monitor whether each of said plurality of workstations are on-line for purposes of keeping each of said plurality of workstations correlated.

26. A method according to claim 20, wherein said industrial controller is a passive participant in the correlation of each of said plurality of workstations, said industrial controller passive in that it does not monitor changes made in each of said plurality of images of said shared memory area.

27. A method according to claim 20, wherein said dynamically correlating step is performed by each of said plurality of workstations at substantially fixed intervals on the basis of respective timer mechanisms associated with each of said plurality of workstations.

* * * * *